D. S. WAGNER.
DRAFT APPLIANCE FOR TRACTORS.
APPLICATION FILED FEB. 18, 1919.
1,322,661.
Patented Nov. 25, 1919.
2 SHEETS—SHEET 1.
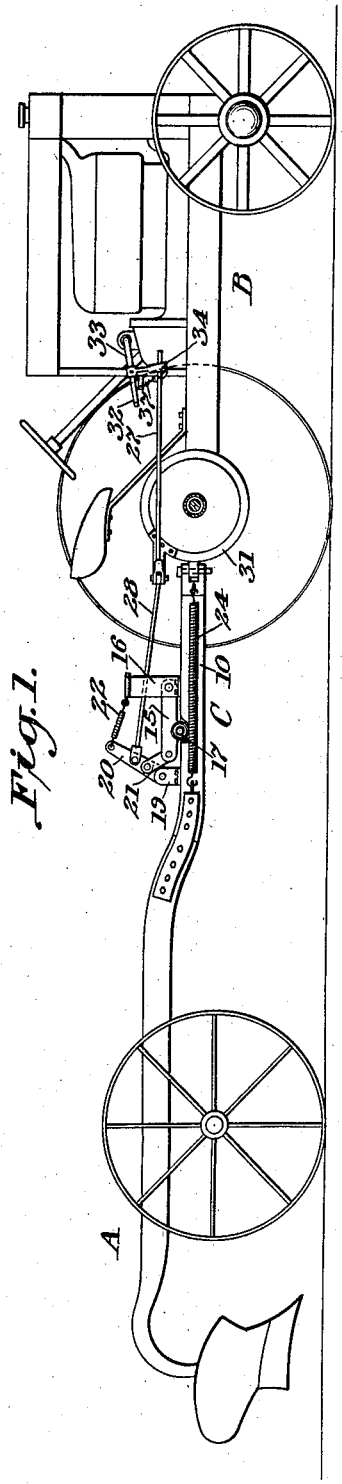
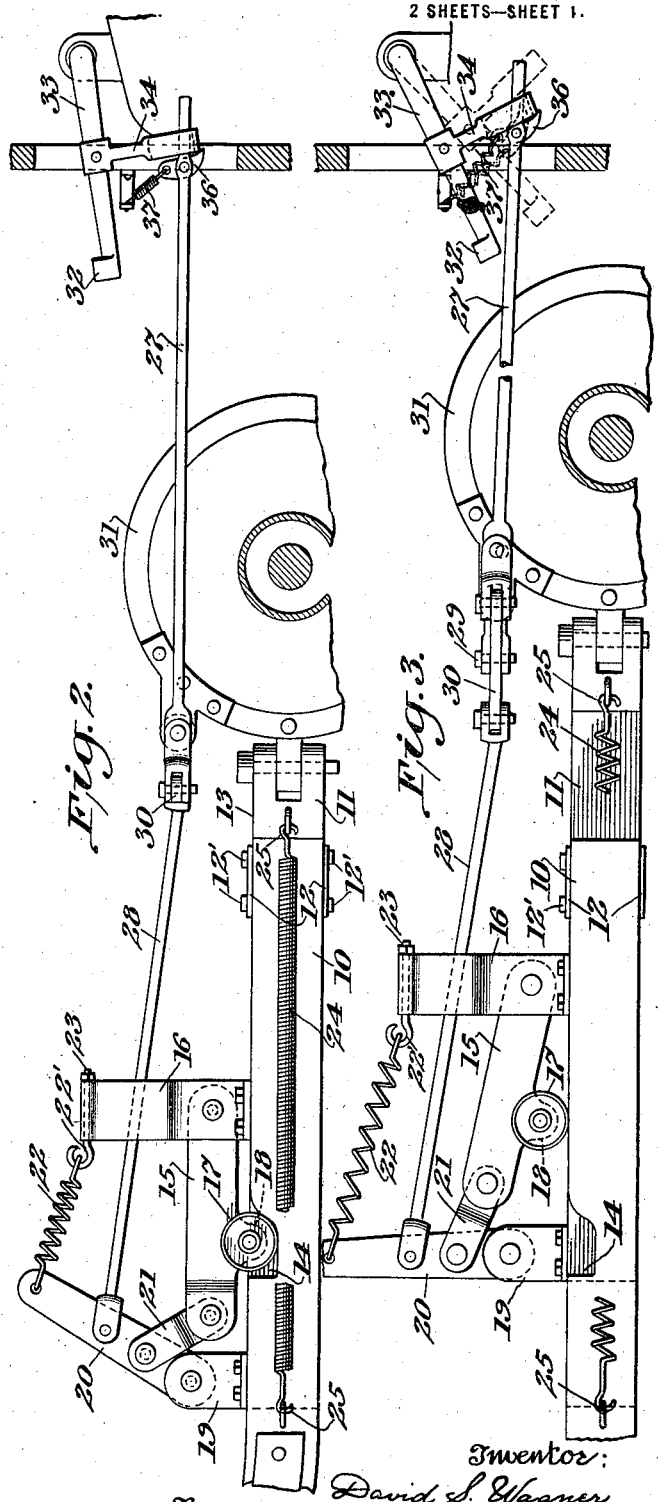
Inventor:
David S. Wagner,
Charles H. Potter,
Attorney.

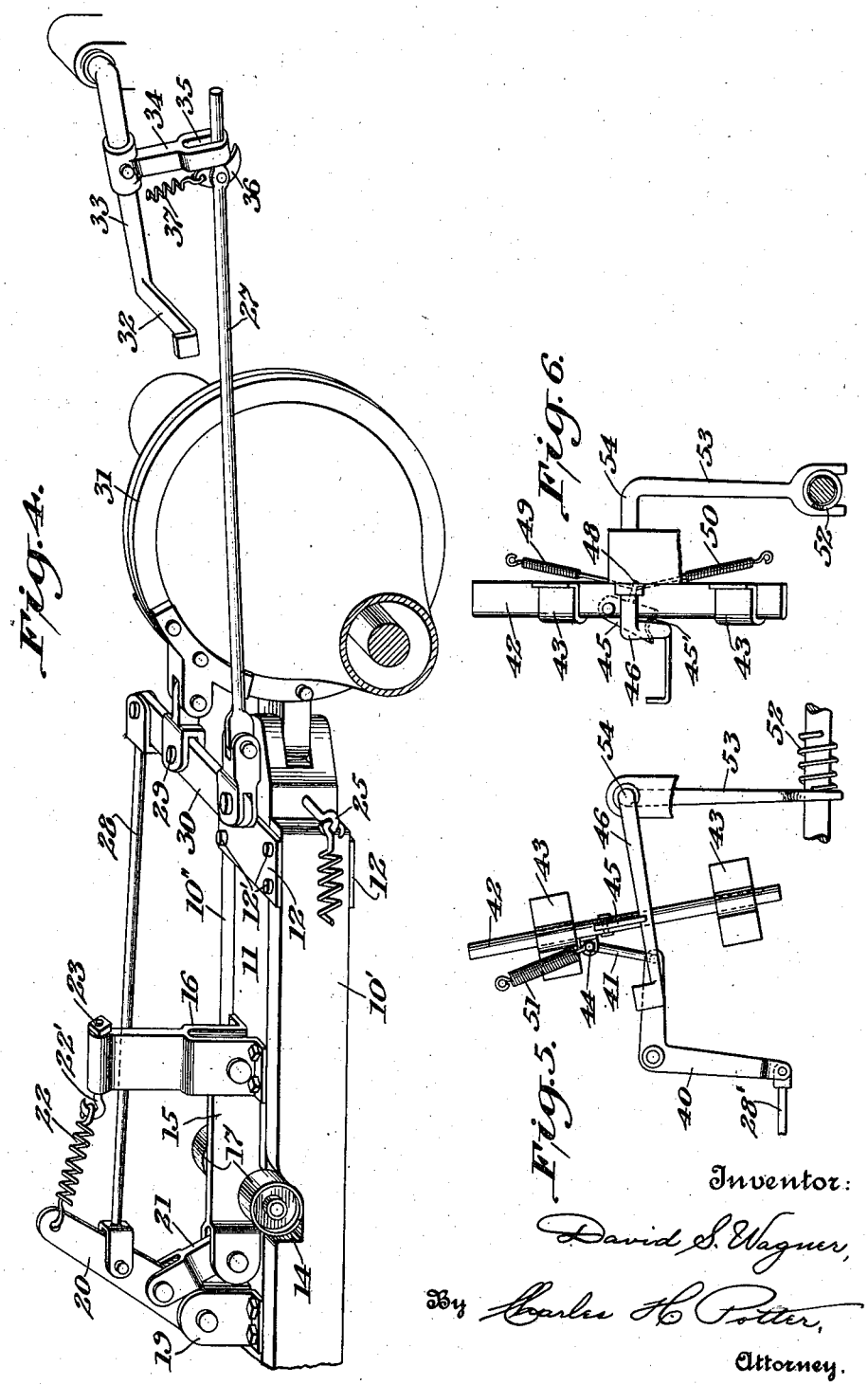

UNITED STATES PATENT OFFICE.

DAVID S. WAGNER, OF CARLISLE, PENNSYLVANIA.

DRAFT APPLIANCE FOR TRACTORS.

1,322,661.    Specification of Letters Patent.    Patented Nov. 25, 1919.

Application filed February 18, 1919. Serial No. 277,729.

*To all whom it may concern:*

Be it known that I, DAVID S. WAGNER, a citizen of the United States, residing at Carlisle, in the county of Cumberland and State of Pennsylvania, have invented certain new and useful Improvements in Draft Appliances for Tractors, of which the following is a specification.

The present invention relates to safety draft appliances for disconnecting a tractor from its power plant when the object drawn, such as a plow, harrow or other soil working implement, strikes an obstruction.

Various safety appliances of this general character have become known, but to my knowledge they all rely solely on a spring coupling designed to yield when the tractive effort exceeds a predetermined limit. When an obstruction is met and the plow stopped, the tractor continues in its motion against the tension of the spring and the relative linear motion between the plow and its tractor is translated by the use of suitable devices to make the tractor inoperative. Such arrangements have the obvious defect that the strain existing in the traction line including the plow and the various connecting parts is unduly increased before the tractor is stopped. To this extent the purpose of an automatic cut out is defeated.

It is the principal object of this invention to provide a coupling which becomes automatically ineffective when a substantially definite tractive effort is exceeded.

It is another object to provide means for making the tractor immediately inoperative when a definite normal tractive effort on the plow is exceeded.

It is another object to provide automatic clutch-releasing mechanism so disposed that the clutch may again be operated, after release by the foot of the operator.

It is still another object to provide automatic plow-stopping means which is substantially self-contained and may be attached to existing plows and tractors with little structural changes in either.

The invention and its principle of operation will be more clearly defined in the specification and its characteristic points more particularly pointed out in the claims.

For a fuller understanding of the invention reference is had to the accompanying drawings in which—

Figure 1 is a side elevation of a tractor-plow structure embodying the invention;

Fig. 2 a fragmentary elevational view showing on an enlarged scale the details of the invention in normal position;

Fig. 3 is a view similar to Fig. 2 but showing the device in operative position immediately after an obstruction has been struck;

Fig. 4 is a perspective view of the arrangement shown in Fig. 2; and

Figs. 5 and 6 are fragmentary side and end views of a modified form.

Having reference to Fig. 1, A represents a plow and B a tractor of any suitable or preferred construction. The plow A is tractively connected to the tractor B by a coupling arrangement, indicated generally by the letter C, which includes means for automatically operating the clutch mechanism to make the tractor inoperative when a predetermined tractive effort is exceeded.

Having now reference to Figs. 1, 2, 3 and 4 the coupling C comprises primarily two elements 10 and 11 which are movable relatively to each other in the line of traction. The element 10 consists preferably of two bars 10' and 10'' (see Fig. 4) rigidly interconnected by plates 12 and screws or bolts 12' extending therethrough into the bars. The bars 10' and 10'' are thus spaced parallel to each other defining a space between them just sufficient to provide a sliding fit for the element or bar 11. The front end of bar 11 is connected by a universal joint element such as clevis 13 to the tractor frame while the rear end of the element 10 is attached in any suitable manner to the plow structure.

In the upper surface of the elements 10 are transversely alined recesses 14 to normally accommodate a locking element attached to the bar 11. This locking element in its broadest conception constitutes in essence a locking bolt interlocking with the element 10 by motion transversely of the line of traction. The particular form of locking element illustrated comprises an arm or lever 15 pivotally mounted in any suitable way as by means of an upright 16 upon the bar 11, rollers 17 pivotally mounted on a depending lug 18 of lever 15, and means acting upon lever 15 to urge the rollers 17 into engagement with the recesses 14. These means, which may assume various other forms, include an upright lug 19 upon which is pivoted a lever 20, a short link 21 pivotally interconnecting the levers 15 and 20 and a spring 22 held under tension between the free end of lever 20 and the upper end of the extended upright 16. All these parts are mounted upon the upper surface of bar 11. The front wall of the recesses 14 is formed to act as a cam element against the rollers 17 to oppose relative movement of the elements 10 and 11 in the line of traction. The particular form of this cam surface is not material within certain limits. Its chief purpose and function is to present in substance an inclined plane toward the rollers 17 to thereby provide a releasable lock. The force tending to urge the rollers into the recesses and the angle of the inclined plane determine the tractive effort necessary to bring about relative movement of the bars 10 and 11. I prefer to round off the upper portion of this cam surface so that the separating motion, once started, may take place instantaneously, i. e. so that the time element during which the excess tractive effort is exerted is reduced to a practical minimum. In other words the pitch of the inclined plane is progressively decreased to make the coupling more sensitive. The tension of the spring 22 may be varied by means of a nut 23 by which the shank of the hook element 22' connected to the spring 22 may be drawn up. By means of this adjustment the disruptive tractive effort may be determined to a nicety.

The elements 10 and 11 are also interconnected by springs 24 connected respectively to the front end of bar 11 and the rear end of bars 10 by means of suitable attaching means such as hooks 25. These springs 24 may serve the purpose, solely, of preventing abrupt separating movement between the coupling elements 10 and 11 after the locking element has become ineffective, or they may be designed and disposed to take initially any desired proportion of the tractive effort. In fact I have found it expeditious to assign to these springs the duty of taking the greater part of the tractive effort where the plow is used on stony ground. Under such conditions continued jerks and jars may tend to make the coupling action between the rollers 17 and the incline of recesses 14 too sensitive and cause premature uncoupling. By causing the springs 24 to take the greater part of the load, the coupling is correspondingly relieved and made less sensitive while the total resistance against uncoupling may be kept the same by suitably adjusting spring 22.

In fact I may, without sacrificing any of the advantages of my invention, go to the other extreme and use the mechanism previously described as locking mechanism as a translating device pure and simple for stopping the tractor when a definite tractive effort sustained by springs 24 is exceeded.

Between these wide limits indicated my device is capable of and particularly designed for substantially instantaneously making the tractor inoperative when an obstruction is encountered.

The motion of the lever 15 is translated to the usual clutch mechanism interposed between the tractor engine and the tractor wheels and operated by a pedal 32. While the specific form of mechanism for translating the motion of lever 15 is not material, the form illustrated in Figs. 1-4 has been found to be particularly useful.

To the pedal crank-arm 33 is rigidly attached a downwardly extending arm 34 having in its lower end a vertically elongated opening 35. On a stationary part of the tractor frame, preferably on the rear-assembly housing 31 is secured in any suitable manner a lever 30 turning intermediate its ends upon a vertical pivot 29. One end of this lever 30 is connected by means of a wire or rod 28 to the lever 20 while the other end is connected to a rod 27 the free end of which passes through the elongated opening 35 in arm 34. Near its free end the rod 27 has a central slot in which is pivotally mounted a pawl 36. This pawl is normally so positioned as to form a shoulder bearing on the arm 34 to cause a forward shifting thereof and a consequent angular movement of the clutch crank 33 when the rod 27 is moved forwardly. The upper end of the pawl 36 is connected by means of a spring 37 to a stationary part of the tractor frame in such a way that the pawl is normally held in substantially vertical position, as just mentioned, but that when the rod 27 is moved forwardly the spring is tensioned and tends to turn the pawl about its pivot into a substantially horizontal position. The purpose and significance of this arrangement is as follows:

When the plow has met an obstruction of such character that the tractive effort exceeds the predetermined limit, the rollers 17 will be forced up the inclined cam surface as previously described. This movement is transmitted through levers 21 and 20 to wire or rod 28 and through the latter and lever 30 to the rod 27 forcing it forwardly, thereby effecting by the downward movement of the clutch crank 33 the disengagement of the clutch (see Fig. 3). The spring 37 has thereby been stretched and tends to pull the upper end of pawl 36 backward and the lower end forward. If now the pedal 32 is pressed still farther down by the foot of the operator, the arm 34 is swung farther forwardly and out of engagement with the lower end of the pawl. The pawl is now free to swing about its pivot and is brought through the agency of spring 37 into a substantially horizontal position i. e. substantially into alinement with the rod 27. When the pedal is now released by the operator, the arm 34 is free to pass backwardly over the rod 27 and pawl 36 and the crank arm 33 is free to return, urged by the usual spring (indicated at 52 in Fig. 5) to its normal clutch-engaging position.

It is understood that the operator, before he releases the clutch pedal, has in meantime reversed the direction of drive so that when the clutch is again in operation the tractor is moved back slightly to return the coupling elements 10 and 11 to their normal condition and allowing the locking element 17 to again effect the coupling as before. The translating devices will automatically resume their normal position and the pawl 36 will again be held in its normal vertical position as previously described. The whole arrangement is now again set and ready to perform its function anew.

Figs. 5 and 6 represent a modification of that part of the mechanism which has to do with the operation and release of the clutch. The mechanism associated with the coupling elements 10 and 11 is the same as described in connection with Figs. 1–4. A rod or wire 28' connects the lever 20 with a bell-crank 40 which is in turn connected by means of a short rod 41 to a slide 42 guided for substantially vertical motion in guide elements 43, the rod 41 being attached to a lug 44 on slide 42. Pivotally attached to the slide 42 is a nose or pawl 45 so positioned that when it swings outwardly beyond the edge of the slide 42 it intercepts the plane of movement of the clutch crank-arm 46 carrying the pedal 47. Projecting from the inner edge of the pawl 45 there is a pin, lug or ear 48 to which are connected springs 49 and 50 which are secured to stationary parts above and below the pin respectively. A spring 51 also secured to a stationary part is connected to the slide 42 preferably to the lug 44. Spring 51 is so positioned that it tends to hold slide 42 in its uppermost position and returns the slide to such position after the forces causing a downward movement of the slide have been removed. Spring 49 is so constituted that a downward movement of slide 42 and pawl 45 causes a tensioning of spring 49 tending to pull the pawl inwardly. Spring 50 is so adjusted that it is neutral when the slide 42 is in its lowermost position, but that it is tensioned when the slide is pulled upwardly by the action of the stronger spring 51 and thereby forces the nose or pawl 45 outwardly into its crank-engaging position, spring 49 becoming neutral as slide 42 approaches its uppermost position.

The operation is as follows:

When the rod 28 has been pulled backwardly as explained in connection with Figs. 1–4, the lower arm of the bell crank is pulled to the left (Fig. 5) and the upper arm pulled down in proportion. Through the agency of link 41 the slide 42 is forced downwardly against the tension of spring 51. The pawl 45 bears on the clutch crank-arm 46 and imparts to it angular motion which causes in the usual way the disengagement of the clutch elements and stops the tractor. During the downward movement of the slide 42 the downward movement of the slide 42 the spring 49 has been tensioned tending to pull the nose 45 inwardly and out of contact with the crank ram 46. As is clearly shown in Fig. 6, the contacting edge 45' is so shaped as to define a retaining point of hook-like curvature which due to the pressure existing at the point of contact is instrumental to prevent the inward motion of the pawl 45. When, however, the foot of the operator forces the pedal a little farther downwardly, the nose or pawl 45 is free to move and impelled by the action of spring 49 snaps inwardly thereby releasing the crank arm 46 which is now free to return to its normal clutch engaging position under the force of the usual spring 52 acting on the arm 53 which is connected to the crankshaft 54. The slide 42 has in the meantime returned to its upper or normal position and the pawl 45 has again been forced outwardly, as before stated to its crank arm-intercepting position. The whole arrangement is now again ready to perform its function anew.

Before the operator releases the pedal to engage the clutch, he must of course reverse the direction of drive to bring the tractor back so that the coupling may be remade as previously explained.

To review the most characteristic feature of the invention it may be stated that the coupling is made ineffective by the movement of a locking element transversely of the line of traction. This means that the component of motion in the line of traction necessary to effect the disengagement is a minimum or practically zero and that consequently the release is substantially instantaneous when the predetermined tractive effort is exceeded. The strain on the plow or other parts in the line of traction is therefore instantaneously relieved and the danger due to a continuation of the strain or even increase of the strain prior to release avoided.

The second and equally important feature is the simplicity and ease of effecting the operation of the clutch after disengagement.

It is only necessary to slightly press on the pedal to make the clutch independent of the automatic disengaging means and render it at once available for normal control of the tractor.

In the foregoing I have illustrated and described a concrete structure and one modification of a part to indicate by way of example the general principles on which the invention is based. The idea of means for carrying out the objects of the invention may be executed in many ways and by various mechanisms.

I wish to have it fully understood that the springs 24 are not essential for the purposes of my invention, although, as I have pointed out, I may use them as traction springs. The coupling consists primarily of the coupling elements 10 and 11 and the coupling is to be considered as becoming ineffective as soon as the locking elements are forced out of their locking position transversely of the elements 10 and 11. When the springs 24 are used as traction springs they merely represent by their action parallel to the coupling itself a mechanical shunt without changing or destroying the character of the coupling as such. They are also useful for preventing the running ahead of the tractor and for neutralizing the sudden impact due to the impetus of the tractor when the plow is stopped on relatively hard ground.

It is also understood that the location of the coupling may be changed in various ways relatively to the body of the plow or to the tractor or to both.

I claim:

1. In combination with a power-driven tractor and an object to be drawn thereby, an unyielding coupling for tractively interconnecting the tractor and the object, said coupling being constructed and arranged to normally withstand a substantially definite tractive effort and to become inoperative when said effort is exceeded, and means associated with the coupling for making the tractor inoperative when the coupling becomes inoperative.

2. In combination with a power-driven tractor and an object to be drawn thereby, an unyielding coupling for tractively interconnecting the tractor and the object, said coupling being composed of separable interlocking elements so constructed and arranged as to unyieldingly withstand a substantially definite tractive effort and to become inoperative when said effort is exceeded, and means associated with the coupling for making the tractor inoperative when the coupling becomes inoperative.

3. In combination with a power-driven tractor and an object to be drawn thereby, an unyielding coupling for tractively interconnecting the tractor and the object, said coupling being composed of separable rigid elements so constructed and arranged as to normally withstand a substantially definite tractive effort and to become inoperative when said effort is exceeded, and means associated with the coupling for making the tractor inoperative when the coupling becomes inoperative.

4. In combination with a power-driven tractor and an object to be drawn thereby, an unyielding coupling for tractively interconnecting the tractor and the object, said coupling being composed of separable elements and means for normally holding them in unyielding locking engagement sufficient to withstand a substantially definite tractive effort and releasing them for free relative movement when the said effort is exceeded, and means adapted to be set in motion to make the tractor inoperative when the said locking engagement is broken.

5. In combination with a power-driven tractor and an object to be drawn thereby, a coupling for tractively interconnecting the tractor and the object, said coupling being composed of elements having relative movement in the line of traction, means for locking and unlocking the said elements by a movement transversely of the line of traction, said means being constructed and arranged to hold the elements in locking engagement against a substantially definite tractive effort and to move into unlocking position when said effort is exceeded, and means actuated by the locking means during the unlocking movement thereof to make the tractor inoperative.

6. In combination with a power-driven tractor and an object to be drawn thereby, a coupling for tractively interconnecting the tractor and the object, said coupling being composed of two elements having relative movement in the line of traction, locking means secured on one of said elements and movable transversely of the line of traction into and out of locking engagement with the other of said elements, said second element and said locking means being normally so related that the coupling is effective to withstand a definite tractive effort and that the locking means moves into unlocking position when said effort is exceeded, and means actuated by the locking means during the unlocking movement thereof to make the tractor inoperative.

7. In combination with a power-driven tractor and an object to be drawn thereby, a coupling for tractively interconnecting the tractor and the object, said coupling being composed of two elements having relative movement in the line of traction, locking means secured on one of said elements and movable transversely of the line of traction, the other of said elements having a recess to be engaged by said locking means, the recess and locking means being normally so related that the coupling is effective to withstand a definite tractive effort and that the locking means moves into unlocking position when said effort is exceeded, and means actuated by the locking means during the unlocking movement thereof to make the tractor inoperative.

8. In combination with a power-driven tractor and an object to be drawn thereby, a coupling for tractively interconnecting the tractor and the object, said coupling being composed of two elements having relative movement in the line of traction, locking means secured on one of said elements and movable transversely of the line of traction, the other of said elements having a recess to be engaged by said locking means, means for continuously urging the locking means into engagement with the said second element, the recess and locking means being so related that the coupling is effective to withstand a definite tractive effort and that the locking means moves into unlocking position when said effort is exceeded, and means actuated by the locking means during the unlocking movement thereof to make the tractor inoperative.

9. In combination with a power-driven tractor and an object to be drawn thereby, a coupling for tractively interconnecting the tractor and the object, said coupling being composed of two elements having relative movement in the line of traction, one of said elements having a recess defining a curved shoulder, locking means secured on the other of said elements and movable transversely of the line of traction into and out of said recess, the said locking means having a rounded surface normally engaging the said shoulder, the shoulder and surface being so related that the coupling is effective to withstand a definite tractive effort and that the locking means moves into unlocking position when said effort is exceeded, and means actuated by the locking means during the unlocking movement thereof to make the tractor inoperative.

10. In combination with a power-driven tractor and an object to be drawn thereby, a coupling for tractively interconnecting the tractor and the object, said coupling being composed of two bars having relative movement in the line of traction, one of said bars having a recess transversely of the line of traction, the other of said bars having a key adapted to move into and out of said recess, adjustable means for continuously urging the key into engagement with the recess, the recess, key and adjustable means being so related that the coupling is effective to withstand a definite tractive effort and become ineffective when said effort is exceeded, and means for making the tractor inoperative when the coupling becomes ineffective.

11. In combination with a power-driven tractor and an object to be drawn thereby, a coupling for tractively interconnecting the tractor and the object, said coupling being composed of two elements having relative movement in the line of traction, one of said elements having a recess defining a shoulder, locking means secured on the other of said elements and movable transversely of the line of traction into and out of said recess, the said locking means having a rounded surface normally engaging the said shoulder, the shoulder and surface being so related that the coupling is effective to withstand a definite tractive effort and that the locking means moves into unlocking position when said effort is exceeded, and means actuated by the locking means during the unlocking movement thereof to make the tractor inoperative.

12. In combination with a pedal-controlled tractor and an object drawn by the tractor, mechanism responsive to the tractive effort, said mechanism being connected with the control pedal to make the tractor inoperative when a predetermined tractive effort is exceeded, and means whereby the pedal may be released from said mechanism by the foot of the operator.

13. In combination with a clutch-controlled tractor and an object drawn by the tractor, a clutch-pedal for operating the clutch to disconnect the tractor wheels from the power plant, mechanism responsive to the tractive effort, said mechanism being connected to the clutch-pedal to move it to unclutching position when a predetermined tractive effort is exceeded, means included in said mechanism for holding the pedal in the unclutching position, and means whereby the pedal may be released by the foot of the operator from the said holding means and made independent of the said mechanism.

14. In combination with a clutch-controlled tractor and an object drawn by the tractor, a clutch-pedal for operating the clutch to disconnect the tractor wheels from the power plant, mechanism responsive to the tractive effort, said mechanism being connected to the clutch-pedal to move it to unclutching position when a predetermined tractive effort is exceeded, said mechanism including a movable bar and a pawl thereon adapted to engage the pedal arm to move it into and holding it in unclutching position, and means whereby the pedal may be released by the foot of the operator from the said pawl and made independent of the said mechanism.

15. In combination with a clutch-controlled tractor and an object drawn by the tractor, a clutch-pedal for operating the clutch to disconnect the tractor wheels from the power plant, mechanism responsive to the tractive effort, said mechanism being connected to the clutch-pedal to move it to unclutching position when a predetermined tractive effort is exceeded, said mechanism including a movable bar and a pawl thereon, an arm rigidly connected to the pedal arm, the bar, pawl and arm being so related that when the bar is moved in one direction, the arm on the pedal arm is engaged by the said pawl and the pedal moved into and held in unclutching position, and means whereby the said pawl is made ineffective as a holding means when the arm on the pedal arm is moved out of engagement with the pawl.

16. In combination with a clutch-controlled tractor and an object drawn by the tractor, a clutch-pedal for operating the clutch to disconnect the tractor wheels from the power plant, mechanism responsive to the tractive effort, said mechanism being connected to the clutch-pedal to move it to unclutching position when a predetermined tractive effort is exceeded, said mechanism including a bar having pivotal and longitudinal motion in the plane of motion of the pedal arm, an arm one end of which is rigidly connected with the pedal and the free end of which has a loose sliding fit on the said bar, a pawl pivotally mounted on the bar, said pawl being normally so positioned that upon movement of the bar in longitudinal direction it engages the free end of said arm and locks the bar to the arm against relative sliding motion, and means for making the locking action of the pawl ineffective when the arm is moved out of engagement with the pawl by the foot of the operator.

In testimony whereof I affix my signature.

DAVID S. WAGNER.